Feb. 18, 1936.  R. REICHMANN  2,031,129
METHOD OF MAKING SHAPED BODIES OF NONPLASTIC METALLIC OXIDES
Filed Jan. 6, 1933
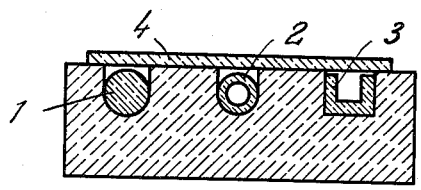
Inventor,
Reinhold Reichmann
By [signature]
Att'y Patented Feb. 18, 1936

2,031,129

UNITED STATES PATENT OFFICE 2,031,129

METHOD OF MAKING SHAPED BODIES OF NONPLASTIC METALLIC OXIDES

Reinhold Reichmann, Berlin, Germany, assignor to Siemens & Halske, Aktiengesellschaft, Siemensstadt, near Berlin, Germany, a corporation of Germany Application January 6, 1933, Serial No. 650,462
In Germany November 19, 1932

10 Claims. (Cl. 25—156)

My invention relates to a method of making shaped bodies of non-plastic metallic oxides.

Various methods have been heretofore proposed for molding non-plastic metallic oxides such as oxides of aluminum, magnesium, thorium, zirconium. According to one method a slip activated with acid is molded in absorbing molds and the bodies, hardened after the removal of the moisture by means of absorbing molds, are sintered at a temperature above 1600° C. According to another method the finely divided basic substances are mixed with a binding agent capable of rendering the mass plastic, such as water glass, gum tragacanth, glycerine, boric acid, pressed in a mold and baked after their removal from the mold.

The first method produces owing to the absence of a binding agent particularly high grade bodies of pure oxides or oxide mixtures. However, this method requires a large number of exact forms. They are of limited life and are made of such material that it takes a long time before the moisture is removed from the molded bodies.

In the method in which a binding agent capable of rendering the mass plastic is employed, it happens that the binding agent impairs the properties of the finished product, unless it is possible to remove the binding agent completely. The use of a binder should not be concluded from the nature of the finished product. Furthermore, the manufacture of many articles encounters difficulties or it is not at all possible when pressing the mass in pressure-tight molds. Moreover, the initial cost of pressure-tight molds is very high. In view of the variety of forms and dimensions of the bodies to be manufactured a large number of molds must be available.

According to the method of my invention a binding agent capable of rendering the mass plastic is employed for molding non-plastic metallic oxides. The binding agent is added to practically pure finely divided oxides and the mass is intimately mixed by the use of press rollers (calenders). The mixture is extruded or pressed, if desired, by using one or more mandrels in a forming press, through mouthpieces or forming nozzles corresponding to the desired shapes; the pressings are then dried and finally sintered at a temperature of above 1600° C.

The grinding of the oxides to a pulverized state is continued until a size of grain of about 2 to 15 $\mu$ is attained. Care should be taken during the grinding not to allow any impurities, particularly silicic acid to pass into the material to be ground. Mills having a lining containing porcelain or silicate should not be employed for grinding the material.

When adding binding agents to the oxides, the mixture is moistened. During the pressing of the mass by means of the press rollers, a disintegration proper of the oxides does not occur, but the binding agent, for instance, tragacanth, is so thoroughly ground, and its particles opened and distributed that it uniformly surrounds the individual oxide particles with an extremely thin coating so that the particles adhere to one another. The intimate mixture of the constituents is supported and the ductility is enhanced by a pretreatment of the oxides, i. e., by activating the latter with hydrochloric acid.

If gum tragacanth is employed as binding agent for rendering the mass plastic, an admixture of less than 8 per cent by weight should be employed. An admixture of 8 or 10 per cent as already proposed is too high. Even in the case of the most intimate mixture with oxides, the binding agent would separate the oxide particles too far apart from one another so that no complete combination of the oxide particles would occur, when sintering, unless extremely high temperatures be applied. An admixture of 5 to 6 per cent proves to be particularly suitable.

When extruding the mixture through the mouthpiece or nozzle of a forming press, it is possible to produce bars or tubular forms of a considerable length, for instance, of more than 1 meter. The mouthpieces are as compared to press molds simpler to manufacture, since they have no bottoms. Their height is independent of the height of the bodies to be manufactured. Owing to the thorough preparation and mixture of the mass, it is possible to manufacture not only articles of any desirable cross-section, but also hollow bodies, particularly tubes having various parallel ducts and any wall thickness up to a fraction of a millimeter. Numerous individual bodies of different lengths may be produced from a bar without any necessity of using various molds. The bars or the individual bodies provided may be further molded by bending or kneading before drying them, thus obtaining a large number of bodies which cannot be otherwise manufactured from non-plastic metallic oxides.

The bars or tubular bodies coming from the press may be placed in grooves of different cross-section arranged in a support or base plate to support the same as disclosed in the drawing. The bars 1 and hollow tubes 2 are placed in open grooves having at the bottom the form of a semi-circle, whereas the side walls are straight. Bars 3 of rectangular cross-section are placed in grooves of rectangular form. The upper edge of the bodies placed in the grooves reaches nearly the upper edge of the grooves. The grooves are covered by a cover plate 4 so as not to allow the bodies to dry too rapidly. If a glass plate is used the drying may be observed. The air can only be admitted at the open ends of the grooves. If hollow bodies are to be manufactured which are closed at one end, such as pyrometer tubes, the open end of the tube may be closed by a plug of the same material as that of the tube, and the end is then ground and sintered to form a tight joint. The dry base plates must consist of such a substance as will not abstract any moisture from the bodies. Metallic molds may be employed for this purpose. However, they are relatively expensive, and are preferably used in the case of manufacturing bodies of a predetermined cross-section on a relatively small scale. For many purposes the use of cheap plaster base plates which are easily manufactured suffices. These must have a coating closing the surface pores to render them non-absorbing. To this end, a lacquer may be employed. However, it is also sufficient if the base plates are greased or treated with modeling soap. Such coatings have, moreover, the advantage that the corresponding bodies may be easily shifted in the grooves of the base plate when they contract during the drying so that no flaws occur. The friction between the grooves and the bodies may be further reduced by rubbing the surface with talcum.

The bodies dried in the open air have an extremely high strength. They may be machined in any manner, i. e., they may be turned, bored and provided with inner and outer threads. From a half-finished product, it is possible particularly by turning, to obtain a variety of complete forms which cannot be obtained either by pouring a slip into a mold or by pressing the mass in pressure-tight molds. The machining of air-dried bodies is, moreover, much simpler and cheaper than if the bodies—manufactured with a binding agent capable of rendering the mass plastic in a press with pressure-tight molds as has already been proposed—are at first prefired at a temperature up to 1400° C. in order that they thereby attain the desired mechanical strength. The calories necessary for the firing at a temperature of 1400° C. are in this case again lost to the process and constitute a considerable waste of heat, since the bodies must be cooled down for the machining and later upon sintering must be heated again from the cold state. Besides, the binding agent is rendered substantially inactive in the case of bodies prefired at a temperature of 1400° C.

The oxide particles in the case of a prefired body lie freely on the surface and are broken off during the machining. It is, therefore, very difficult to obtain a uniform and smooth surface, which is of particular importance if it is a question of making bodies with an extremely exact and smooth surface such as is the case with dies, or insulators for spark plugs and the like. It may be said, in addition to the remarks made above, that a prefired body is brittle and also complicates for this reason the machining, whereas the bodies manufactured according to the invention contain the entire binding agent which renders the mass plastic during the machining. This is of importance in the case of insulators of this kind and other bodies. The oxide particles are enclosed by the binding agents, thus supporting the machining; especially the turning or grinding may be effected uniformly so that smooth and exact surfaces are obtained.

The dried bodies are then sintered in a wellknown manner directly or subsequent to an additional machining at a temperature above 1600° C. The sintering temperature is varied somewhat depending upon the kind and quantity of oxides employed. In the case of alumina as basic constituent a sintering temperature suffices which does not reach the value of 1800° C.

The method according to the invention is applicable for single oxides as well as for forming masses which consist of mixtures of different oxides and in the case of which certain properties of the finished product are to be obtained by the simultaneous use of several oxides or the properties of an oxide are to be influenced in a desired manner by adding another oxide. Besides the above-named oxides, it is also possible to treat in this manner other oxides such as beryllium, hafnium, titanium, chromium, manganese and the like.

The manufacture of shaped bodies consisting of mixtures of various oxides according to the method of molding heretofore known encounters great difficulties and in many cases it is absolutely impossible. The preparation of a casting slip in which the various ingredients are to be distributed uniformly is also very difficult. Even if this were possible, a separation of the ingredients occurs in the plaster mold during the withdrawal of moisture with the result that bodies are obtained with irregular distribution of the various ingredients, which is also very disadvantageous during the subsequent baking. The shrinkage is irregular so that a distortion of the mold occurs. The formation of cracks is thereby supported. The irregularity of the composition also impairs the durability of the bodies when used, whereas according to the method of my invention a completely uniform mass is not only obtained by treating it with a binding agent and by pressing it in a calender press or by means of suitable press rollers but no separation of the constituents occurs in this mass even when subsequently machined. By the use of moderate admixtures of the binding agent and its extremely fine and uniform pulverization and intimate mixture with the oxides, shaped bodies may be obtained after the sintering which are as perfect as those bodies which have hitherto been attained by pouring pure oxides into the mold. During the sintering, it is possible to again separate completely and in due time the binding agent present in small quantities and finely distributed in the mass so that the oxide particles may be caused to coalesce so as to form a compact body. The bodies have high electric resistance. They are resistant to high temperatures and insensitive to sudden changes of temperature. Bodies with high heat conductivity may also be manufactured depending upon the percentage of the one or other substance.

I claim as my invention:—

1. The method of producing shaped bodies of non-plastic metallic oxides which consists in reducing a metallic oxide to a granular state, thinly coating the oxide granules with a foreign binding agent by rolling the oxide and the binding agent in the presence of pressure, extruding the resulting plastic mixture to form said bodies, drying said bodies and sintering said bodies at a temperature above 1600° C.

2. The method of producing shaped bodies of non-plastic metallic oxides which consists in grinding a metallic oxide to reduce the oxide to a granular state, treating said granular oxide with hydrochloric acid to activate the same, thinly coating the oxide granules with a foreign binding agent by rolling the compound composed of said granular oxide and said binding agent in the presence of pressure to produce a plastic mixture, extruding said mixture to form said bodies, drying said bodies, and sintering said bodies at a temperature above 1600° C.

3. The method of producing shaped bodies of non-plastic metallic oxides which consists in pulverizing a metallic oxide, adding to said pulverized oxide a binding agent in a quantity not in excess of 8 percent by weight, thinly coating the individual oxide particles with said binding agent by rolling the oxide and the binding agent in the presence of pressure to form a plastic mixture, extruding said mixture to form said bodies, drying said bodies, and sintering said bodies at a temperature above 1600° C.

4. The method of producing shaped bodies of non-plastic metallic oxides which consists in pulverizing a metallic oxide, thinly coating the oxide particles with a binding agent by rolling the oxide and the binding agent in the presence of pressure to produce a plastic mixture, extruding a predetermined quantity of said mixture to form a plastic elongated member, shaping said bodies from said member, drying said bodies, and subsequently sintering said bodies at a temperature above 1600° C.

5. The method of producing shaped bodies of non-plastic metallic oxides which consists in pulverizing a metallic oxide, thinly coating the individual oxide particles with a binding agent by rolling the oxide and the binding agent in the presence of pressure to form a plastic mixture, extruding a quantity of said mixture to form a pre-shaped body, drying said pre-shaped body in an atmosphere to which only the ends thereof are directly exposed, machining said pre-shaped body to form the final body therefrom, and sintering said body at a temperature above 1600° C.

6. The method of producing shaped bodies of non-plastic metallic oxides comprising, reducing a metallic oxide to a granular state, thinly coating the granules of said oxide with a binding agent by rolling the oxide and the binding agent in the presence of pressure, extruding a quantity of the resulting plastic mixture to form a pre-shaped body, finally forming said extruded pre-shaped body, drying said finally formed body, and sintering said body at a temperature above 1600° C.

7. In the manufacture of shaped bodies made of non-plastic metallic oxides, the steps consisting in preparing a metallic oxide to form a plastic mixture, extruding a quantity of said mixture to form a substantially straight elongated member of predetermined cross section, bending said member to form said bodies therefrom, drying said bodies, and sintering said bodies.

8. In the manufacture of bodies made of non-plastic metallic oxides, the steps consisting in preparing a metallic oxide to form a plastic mixture, extruding a quantity of said mixture to produce a pre-formed elongated member of pre-determined cross section, drying said member and then forming said bodies therefrom and sintering said shaped bodies.

9. In the manufacture of bodies made from non-plastic metallic oxides, the steps comprising, taking pulverized oxides, adding thereto a binding agent, treating the resulting mixture to form a plastic substance wherein the individual oxide particles are thinly and substantially uniformly coated with said agent, forming said bodies from said plastic substance, and sintering said bodies to form uniformly compact oxide structures.

10. The method of producing shaped bodies of non-plastic metallic oxides which consists in pulverizing a metallic oxide, adding to said oxide gum tragacanth in a quantity of 5 to 6 percent by weight, thinly coating the individual oxide particles with said gum by rolling the oxide and the gum in the presence of pressure to form a plastic mixture, extruding said mixture to form said bodies, drying said bodies, and sintering said bodies at a temperature above 1600° C.

REINHOLD REICHMANN.